G. A. KING.
STEERING MECHANISM FOR VEHICLES.
APPLICATION FILED NOV. 16, 1916.
1,254,144.
Patented Jan. 22, 1918.
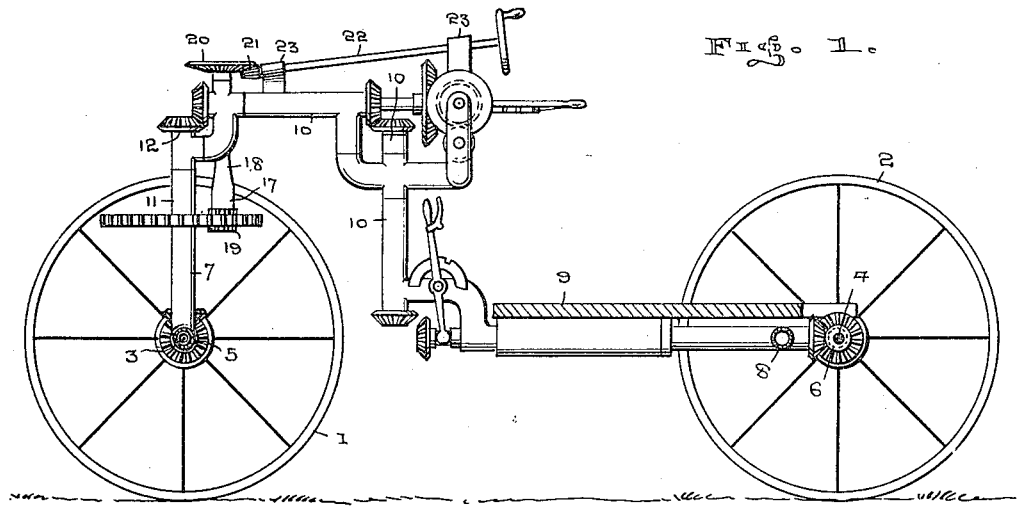
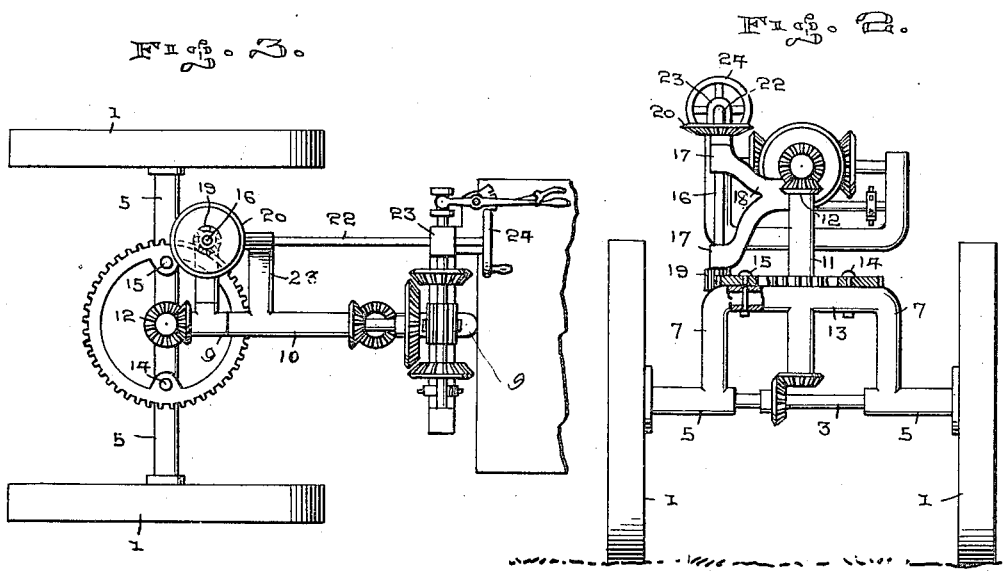

UNITED STATES PATENT OFFICE.

GEORGE A. KING, OF MAPLE FALLS, WASHINGTON.

STEERING MECHANISM FOR VEHICLES.

1,254,144.     Specification of Letters Patent.     Patented Jan. 22, 1918.

Application filed November 16, 1916. Serial No. 131,718.

*To all whom it may concern:*

Be it known that I, GEORGE A. KING, a citizen of the United States, residing at Maple Falls, in the county of Whatcom and State of Washington, have invented certain new and useful Improvements in Steering Mechanism for Vehicles; and I do hereby declare the following to be a full, clear, and exact description of the invention, such as will enable others skilled in the art to which it appertains to make and use the same.

This invention relates to new and useful improvements in steering mechanism for vehicles, and primarily for use in connection with a motor vehicle designed to carry breaking or other forms of plows.

Another object of the invention is the provision of steering mechanism whereby the front wheels of the vehicle may be turned in angular relation with respect to the longitudinal axis of the vehicle.

A further object is the provision of a yoke mounted upon the front axle of the vehicle and steering mechanism connected thereto whereby the front axle may be rotated to any desired angle with respect to the vehicle so as to enable the same to be turned around in the shortest possible space.

With these and other objects in view as will appear as the description proceeds, the invention comprises the various novel features of construction, combination, and arrangement of parts as will be more fully set forth in the accompanying specification.

Referring to the drawings,

Figure 1 is a sectional elevation of a vehicle showing the application of my improved steering mechanism thereto.

Fig. 2 is an end elevation of the front of the vehicle, and

Fig. 3 is a detail plan view of the steering mechanism.

Similar characters of reference are used to denote like parts throughout the accompanying drawings and the annexed specification.

Referring more particularly to the drawings, the reference numerals 1 and 2 designate the supporting wheels of the vehicle, which are mounted on the front and rear axles 3 and 4 respectively, each axle being preferably surrounded by a tubular casing 5 and 6, the casing 5 being provided with an upwardly extending yoke 7, while the casing 6 is provided with a horizontally extending yoke 8.

The yokes 7 and 8 are connected through the medium of a suitable frame work 9, which is shown to consist of a plurality of vertically and horizontally extending casings 10, through which are disposed parts of the driving mechanism of the vehicle.

The yoke 7 is provided centrally with a vertically extending extension 11 through which passes a pivotal member 12, whereby the yoke 7 is pivotally connected to the forward end of the vehicle frame 9. By this pivotal connection with the vehicle frame, it will be obvious that the yoke 7 carrying the forward axle 3 may be rotated so as to dispose the front wheels in any angular relation with respect to the longitudinal axis of the vehicle, thus enabling the latter to be turned around in the shortest possible space.

Mounted upon and attached to the cross arms 13 of the yoke 17 is a circular rack 14, the latter being attached thereto in any suitable manner, and in this instance by bolts, as indicated at 15 which pass through the arms 13.

Disposed to one side of the vertical extension 11 is a vertically extending shaft 16, which is journaled and supported in bearings 17 of an arm 18 that is rigidly secured to the frame 9 of the vehicle. The lower end of this shaft 16 is provided with a spur gear 19 which meshes with the circular rack 14, while the upper end of the shaft 16 is provided with a beveled gear 20.

A pinion 21 meshes with this beveled gear 20 and is mounted upon the forward end of the steering rod 22 that is journaled in bearings 23 mounted upon the vehicle frame, the rear end of this steering rod being provided with a hand wheel 24, whereby the steering shaft will be rotated to revolve the vertical shaft 16, which in turn, will rotate the circular rack 14, thus turning or rotating the front axle of the vehicle to any desired angle with respect to the longitudinal axis of the vehicle.

From this construction, as set forth above, it will be apparent that the yoke may be rotated to any desired angle with respect to the vehicle, or it may be rotated completely upon its pivotal connection with the vertical frame.

From the foregoing description, taken in connection with the accompanying drawings, the advantages of construction and the method of operation of the invention, together with the device which I now consider to be the best embodiment thereof, will be readily understood by those skilled in the art to which the invention relates, and while I have described the principle of operation of the invention, together with a device which I now consider to be the best embodiment thereof, I desire to have it understood that the device shown is merely illustrative and that such changes may be made when desired as are within the scope of the appended claim.

What I claim is:—

In a steering mechanism of the class described, a front axle, a casing for said axle, supporting wheels on the axle, a yoke formed on said casing, a circular rack attached to said yoke, a gear meshing with said rack, a shaft to which said gear is attached, a beveled gear on the opposite end of the shaft, a pinion meshing with said beveled gear, and means to rotate said pinion whereby the wheels on the forward axle will be shifted to control the travel of the vehicle.

In testimony whereof I have signed my name to this specification in the presence of two subscribing witnesses.

GEORGE A. KING.

Witnesses:
A. S. JOHNSTON,
H. J. STRICKFADEN.

Copies of this patent may be obtained for five cents each, by addressing the "Commissioner of Patents, Washington, D. C."